Oct. 15, 1968   G. H. AKLIN ET AL   3,405,993
HIGH MAGNIFICATION SEMI-APOCHROMATIC MICROSCOPE
OBJECTIVE OF THE FLUORITE TYPE
Filed June 2, 1965

GEORGE H. AKLIN
RICHARD L. SEIDENBERG
INVENTOR.

BY Frank C. Parker

ATTORNEY

United States Patent Office 3,405,993
Patented Oct. 15, 1968

3,405,993
HIGH MAGNIFICATION SEMI-APOCHROMATIC MICROSCOPE OBJECTIVE OF THE FLUORITE TYPE
George H. Aklin, Spencerport, and Richard L. Seidenberg, Rochester, N.Y., assignors to Bausch & Lomb Incorporated, Rochester, N.Y., a corporation of New York
Filed June 2, 1965, Ser. No. 460,658
2 Claims. (Cl. 350—177)

ABSTRACT OF THE DISCLOSURE

An optical objective for a microscope having a magnification of 100× and a numerical aperture of 1.25, the objective being of complex lens construction and characterized by two doublets having fluorite elements so as to provide an image of semi-apochromatic optical quality.

---

The present invention relates generally to optical systems for microscopes and more particularly it relates to improvements in micro-objectives.

The present invention is part of a new development for the multi-objective type of optical system for microscopes which is covered generally by the patent application of Harold E. Rosenberger, Ser. No. 408,875, filed Nov. 4, 1964, wherein a plurality of semi-objectives of different powers are successively combined with a single negative corrector lens.

The principal object of the present invention is to provide a novel micro-objective such as mentioned above, said micro-objective having a high magnification of the order of 100× and having a numerical aperture as large as 1.25, said micro-objective being of the semi-apochromatic type.

It is another object of the present invention to provide a so-called flat-field micro-objective of the semi-apochromatic type in which a high grade of achromatism is achieved while maintaining an excellent state of correction of all monochromatic aberrations as well as distortions, astigmatism and field curvature.

Figure 1:
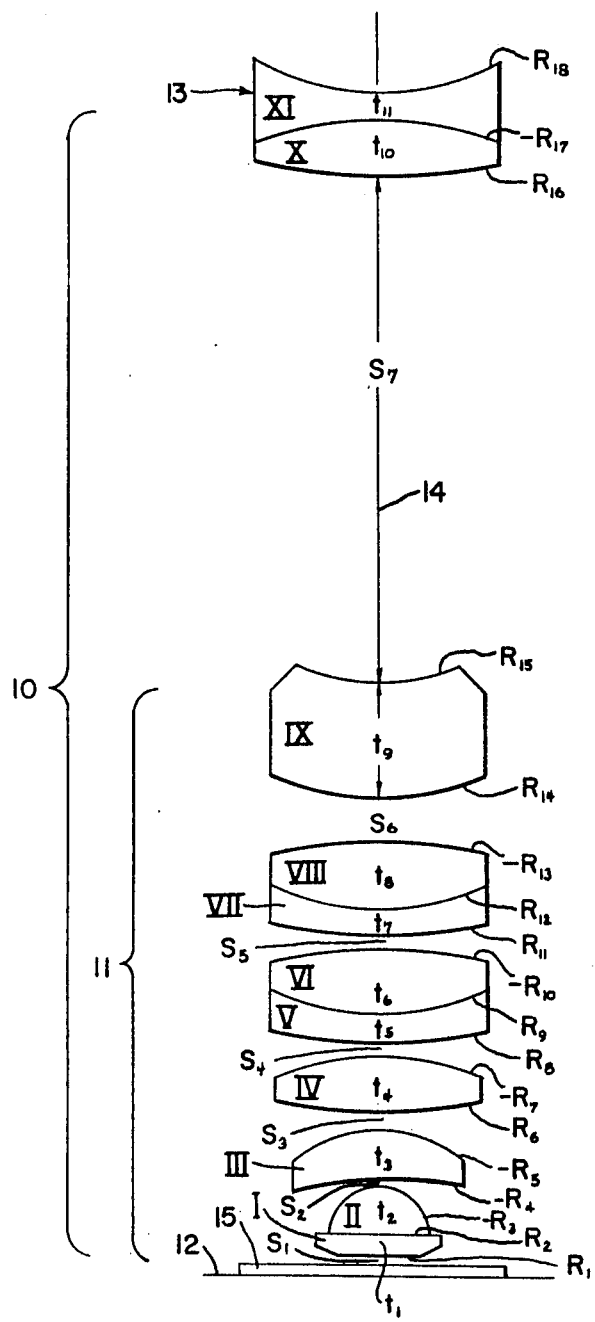
Figure 2:
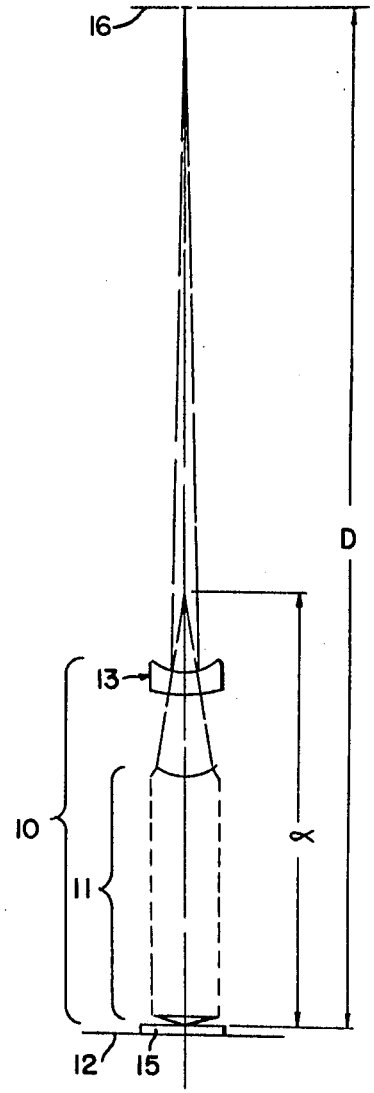

Further objects and advantages will be apparent in the combination and arrangements of the parts of the invention and in the details of construction thereof from a study of the following specification taken together with the accompanying drawing, wherein:

FIG. 1 is an optical diagram showing a complete micro-objective constructed according to a preferred form of the present invention; and FIG. 2 is an optical diagram showing somewhat schematically the micro-objective of FIG. 1 together with a trace of certain image forming rays.

Because of the great difficulty encountered by designers who seek to fully achromatize a micro-objective of high power, such as 100×, the need for suitable optical materials for making the lenses is of paramount importance. In the present invention, the use of fluorite in the positive lens elements of the positive doublets together with high index glass in the negative lens elements thereof yields a satisfactorily high difference in refractive index of at least .230 and difference of Abbé number of at least 60.0.

The micro-objective is designated generally in FIG. 1 by numeral 10 and it is composed of two distinct optically aligned parts which are a front lens group 11 lying nearest to the specimen surface 12, and a corrector lens 13. Similarly to the aforementioned Rosenberger patent application, the front lens group 11 has a positive focal length while the corrector lens 13 has a negative focal length, the lens being particularly so constructed as to correct or reduce to near optimum values the astigmatism and field curvature.

Comprised in said front lens group 11 is a front compound lens member which is located at an axial distance designated $S_1$ along the optical axis 14 away from the exposed rear surface of a cover glass 15 having a thickness of .18 mm. and overlying the specimen. Said compound lens member is composed of a plane parallel plate designated I which is preferably cemented to a rear positive lens element such as a plano convex lens element designated II. Spaced rearwardly at an axial distance designated $S_2$ from lens element II is a concavo-convex singlet lens member designated III, and spaced rearwardly at an axial distance designated $S_3$ therefrom is a double convex singlet lens member designated IV.

At an axial distance designated $S_4$ from member IV is located the first of a pair of doublet lens members which are spaced apart by an axial distance designated $S_5$. The front and rear doublets are composed of front convex-concavo lens elements which are designated V and VII respectively, said elements being cemented to rear double convex lens elements which are designated VI and VIII respectively. Located rearmost in the front lens group 11 is a convex-concavo singlet lens member designated IX at an axial distance designated $S_6$ from the rearmost doublet lens member.

Still further rearwardly is located in the objective 10 the aforesaid doublet corrector lens member 13 at a large axial distance designated $S_7$ from member IX. It is to be noted that lens member 13 is identical with the negative corrector lens of the above-cited Rosenberg application, and constitutes a corrector means not only for the positive lens group 11 herebelow described but also for the series of semi-objectives of different magnifications described therein. The doublet corrector lens member is composed of a front double convex lens element X which is cemented to a rear double concave lens element XI.

The axial thicknesses of the successive lens elements or parts I to XI are designated $t_1$ to $t_{11}$ and the individual focal lengths thereof are designated $F_I$ to $-F_{XI}$ in order from the front, the minus (—) sign signifying negative focal length.

As seen in FIG. 2, the entire objective 10 forms an image at an image plane 16 which is located at a distance D which in this instance is nominally 188.0 mm. from specimen surface 12 and the positive lens group 11 per se forms an image at a distance $\alpha = .426D$ where D represents the object-to-image distance of the objective 10.

According to the present invention, the constructional parameters of the objective lens system 10 are so chosen as to produce an excellent state of correction of spherical aberration, coma, astigmatism and field curvature, and also provides a superior correction for achromatism. The superior achromatic condition is provided by the use of fluorite optical material in the lens elements VI and VIII of positive power and by the use of a high index optical glass in the negative lens elements V and VII. It has been found advantageous to use such materials having a difference of refractive index values of at least .230 along with an Abbé number difference in values of at least 60.0.

The values for the negative focal length $-F_n$ of negative corrector lens member 13 per se is given in the mathematical expression $$.159D < F_n < .195D$$

and ideally has a value $-.177D$, the magnification thereof being 5.0×.

In further detail, the values for the constructional data relating to the aforementioned lens elements I to XI, particularly with regard to the focal lengths $F_I$ to $-F_{XI}$, the lens thicknesses $t_1$ to $t_{11}$, lens spacings $S_1$ to $S_7$, and radii of the successive lens surfaces $R_1$ to $R_{18}$ are given herebelow in terms of the aforesaid quantity D in Table I of mathematical statements, the minus (—) sign used with certain R values meaning that the center of curvature of that surface is located toward the front from the apex of said surface.

TABLE I $.0159D < F_{I, II}$ (Compound front member) $< .0195D$
$.0725D < F_{III} < .0885D$
$.0906D < F_{IV} < .1106D$
$.7630D < F_{V, VI}$ (Front doublet) $< .9230D$
$.6880D < F_{VII, VIII}$ (Rear doublet) $< .8400D$
$.8730D < F_{IX} < 1.0670D$
$.1590D < -F_n < .1950D$
$.000637D < S_1 < .000779D$
$.000010D < S_2 < .000234D$
$.002778D < S_3 < .003394D$
$.002250D < S_4 < .002750D$
$.002201D < S_5 < .002689D$
$.009900D < S_6 < .012100D$
$.111900D < S_7 < .136720D$
$.00499D < t_1 < .00609D$
$.01020D < t_2 < .01246D$
$.01064D < t_3 < .01300D$
$.01244D < t_4 < .01520D$
$.00642D < t_5 < .00784D$
$.01388D < t_6 < .01696D$
$.00642D < t_7 < .00784D$
$.01434D < t_8 < .01752D$
$.02544D < t_9 < .03110D$
$.01186D < t_{10} < .01462D$
$.00718D < t_{11} < .00878D$
$R_1 = $ Plano
$R_2 = $ Plano
$.01038D < -R_3 < .01268D$
$.06093 < -R_4 < .07477D$
$.02647D < -R_5 < .03357D$
$.22446D < R_6 < .27434D$
$.05769D < -R_7 < .07051D$
$.67950D < R_8 < .83050D$
$.04887D < R_9 < .05973D$
$.08163D < -R_{10} < .09977D$
$.24174D < R_{11} < .29546D$
$.04887D < R_{12} < .05973D$
$.12717D < -R_{13} < .15543D$
$.05247D < R_{14} < .06413D$
$.04977D < R_{15} < .06083D$
$.19458D < R_{16} < .23782D$
$.09810D < -R_{17} < .11990D$
$.05067D < R_{18} < .06193D$ As aforesaid, the outstanding feature of the present invention is the achromatization of the lens system 10 by the use of fluorite optical material along with high index glasses, and the absolute values of the refractive index $n_D(I)$ to $n_D(XI)$ of the successive lens elements I to XI, as well as the absolute values of the $\nu$ Abbé number thereof being given in Table II of mathematical statements herebelow,

TABLE II $1.665 < n_D(I) < 1.675$
$1.615 < n_D(II) < 1.625$
$1.615 < n_D(III) < 1.625$
$1.509 < n_D(IV) < 1.519$
$1.684 < n_D(V) < 1.694$
$1.428 < n_D(VI) < 1.438$
$1.663 < n_D(VII) < 1.673$
$1.428 < n_D(VIII) < 1.438$
$1.509 < n_D(IX) < 1.519$
$1.746 < n_D(X) < 1.756$
$1.608 < n_D(XI) < 1.618$
$42.0 < \nu(I) < 52.0$
$55.0 < \nu(II) < 65.0$
$55.0 < \nu(III) < 65.0$
$65.0 < \nu(IV) < 75.0$
$25.0 < \nu(V) < 35.0$
$90.0 < \nu(VI) < 100.0$
$27.0 < \nu(VII) < 37.0$
$90.0 < \nu(VIII) < 100.0$
$65.0 < \nu(IX) < 75.0$
$23.0 < \nu(X) < 33.0$
$40.0 < \nu(XI) < 50.0$

More specifically stated, the values in terms of the quantity D for $F_I$ to $-F_{XI}$, $R_1$ to $R_{18}$, $t_1$ to $t_{11}$, and $S_1$ to $S_7$ are given herebelow in Table III,

TABLE III $F_I = \infty$
$F_{II} = .0186D$
$F_{III} = .0804D$
$F_{IV} = .1006D$
$-F_V = .0851D$
$F_{VI} = .0808D$
$-F_{VII} = .1029D$
$F_{VIII} = .0925D$
$F_{IX} = .9691D$
$F_X = .0957D$
$-F_{XI} = .0594D$
$t_1 = .00553D$
$t_2 = .01133D$
$t_3 = .01181D$
$t_4 = .01383D$
$t_5 = .00713D$
$t_6 = .01542D$
$t_7 = .00713D$
$t_8 = .01596D$
$t_9 = .02830D$
$t_{10} = .01330D$
$t_{11} = .00798D$
$S_1 = .000708D$
$S_2 = .000213D$
$S_3 = .003086D$
$S_4 = .002500D$
$S_5 = .002445D$
$S_6 = .011011D$
$S_7 = .124293D$
$R_1 = $ Plano
$R_2 = $ Plano
$-R_3 = .01153D$
$-R_4 = .06770D$
$-R_5 = .03061D$
$R_6 = .24994D$
$-R_7 = .06395D$
$R_8 = .75484D$
$R_9 = .05418D$
$-R_{10} = .09075D$
$R_{11} = .26905D$
$R_{12} = .05418D$
$-R_{13} = .14120D$
$R_{14} = .05832D$
$R_{15} = .05518D$
$R_{16} = .21570D$
$-R_{17} = .10911D$
$R_{18} = .05621D$ Further with reference to the specific statement of absolute values for the refractive indices $n_D(I)$ to $n_D(XI)$ and the Abbé numbers $\nu(I)$ to $\nu(XI)$, said values are given in Table IV hereinbelow,

TABLE IV $n_D(I) = 1.670$    $\nu(I) = 47.2$
$n_D(II) = 1.620$    $\nu(II) = 60.3$
$n_D(III) = 1.620$    $\nu(III) = 60.3$
$n_D(IV) = 1.514$    $\nu(IV) = 70.0$
$n_D(V) = 1.689$    $\nu(V) = 30.9$
$n_D(VI) = 1.434$    $\nu(VI) = 95.1$
$n_D(VII) = 1.668$    $\nu(VII) = 32.3$
$n_D(VIII) = 1.434$    $\nu(VIII) = 95.1$
$n_D(IX) = 1.514$    $\nu(IX) = 70.0$
$n_D(X) = 1.751$    $\nu(X) = 27.8$
$n_D(IX) = 1.613$    $\nu(XI) = 44.2$

Although only a single form of the present invention has been shown and described in detail, other forms are possible and changes may be made in the details of construction within the prescribed limits without departing from the spirit of the invention as defined in the appended claims.

We claim:

1. A microscope objective lens system having superior image quality at substantially 100× magnification, said system comprising a front plano parallel plate of zero power designated I and located at a working distance designated $S_1$ from the rear surface of a cover glass which has a thickness of .18 mm., and covers the specimen surface, a plano convex lens element designated II, the plano side of which lies in contact with said plate I, a concavo-convex singlet lens member designated III which is spaced at an axial distance $S_2$ from element II, a double convex singlet lens member designated IV which is spaced at an axial distance designated $S_3$ from member III, a front positive doublet axially spaced rearwardly from member IV at a distance which is designated $S_4$, said doublet comprising a front negative meniscus lens element designated V which lies in contact with a positive double convex lens element designated VI, a rear positive doublet which is axially spaced at an axial distance designated $S_5$ from the front positive doublet, the rear doublet comprising a front negative meniscus lens VII which lies in contact with a positive double convex lens element VIII, a convex-concavo singlet lens member designated IX which is spaced at an axial distance designated $S_6$ from said rear doublet, and a negative corrector doublet lens which is spaced rearwardly of member IX at an axial distance designated $S_7$ and is composed of a front double convex lens element designated X which lies in contact with a double concave lens element designated XI, the focal lengths of the respective lens elements I to XI being designated $F_I$ to $-F_{XI}$ and the minus (—) sign used therewith denoting negative focal lengths, the specific values thereof being given in terms of D which is the object-to-image distance of the objective system, being given along with the specific values of the spaces $S_1$ to $S_7$ and $t_1$ to $t_{11}$ represent the axial thicknesses of the successive lens elements I to XI respectively in terms of D, and $n_D$ and $\nu$ represent respectively the refractive index and Abbé number of said elements in non-scalar values, in the table of mathematical statements herebelow, $F_I = \infty$
$F_{II} = .0186D$
$F_{III} = .0804D$
$F_{IV} = .1006D$
$-F_V = .0851D$
$F_{VI} = .0808D$
$-F_{VII} = .1029D$
$F_{VIII} = .0925D$
$F_{IX} = .9691D$
$F_X = .0957D$
$-F_{XI} = .0594D$
$S_1 = .000708D$
$S_2 = .000213D$
$S_3 = .003086D$
$S_4 = .002500D$
$S_5 = .002445D$
$S_6 = .011011D$
$S_7 = .124293D$
$t_1 = .00553D$
$t_2 = .01133D$
$t_3 = .01181D$
$t_4 = .01383D$
$t_5 = .00713D$
$t_6 = .01542D$
$t_7 = .00713D$
$t_8 = .01596D$
$t_9 = .02830D$
$t_{10} = .01330D$
$t_{11} = .00798D$
$n_D(I) = 1.670$
$n_D(II) = 1.620$
$n_D(III) = 1.620$
$n_D(IV) = 1.514$
$n_D(V) = 1.689$
$n_D(VI) = 1.434$
$n_D(VII) = 1.668$
$n_D(VIII) = 1.434$
$n_D(IX) = 1.514$
$n_D(X) = 1.751$
$n_D(XI) = 1.613$
$\nu(I) = 47.2$
$\nu(II) = 60.3$
$\nu(III) = 60.3$
$\nu(IV) = 70.0$
$\nu(V) = 30.9$
$\nu(VI) = 95.1$
$\nu(VII) = 32.3$
$\nu(VIII) = 95.1$
$\nu(IX) = 70.0$
$\nu(X) = 27.8$
$\nu(XI) = 44.2$ 2. A microscope objective lens system having superior image quality at substantially 100× magnification, said system comprising a front plano parallel plate of zero power designated I and located at a working distance designated $S_1$ from the rear surface of a cover glass which has a thickness of .18 mm. and covers the specimen surface, a plano convex lens element designated II, the plano side of which lies in contact with said plate I, a concavo-convex singlet lens member designated III which is spaced at an axial distance $S_2$ from element II, a double convex singlet lens member designated IV which is spaced at an axial distance designated $S_3$ from member III, a front positive doublet axially spaced rearwardly from member IV at a distance which is designated $S_4$, said doublet comprising a front negative meniscus lens element designated V which lies in contact with a positive double convex lens element designated VI, a rear positive doublet which is axially spaced at an axial distance designated $S_5$ from the front positive doublet, the rear doublet comprising a front negative meniscus lens VII which lies in contact with a positive double convex lens element VIII, a convex-concavo singlet lens member designated IX which is spaced at an axial distance designated $S_6$ from said rear doublet, and a negative corrector doublet lens which is spaced rearwardly of member IX at an axial distance designated $S_7$, and is composed of a front double convex lens element designated X which lies in contact with a double concave lens element designated XI, the axial thicknesses of the successive lens elements I to XI being designated $t_1$ to $t_{11}$, the radii of the successive surfaces of said lens elements being designated $R_1$ to $R_{18}$ and the minus (—) sign used therewith meaning that the centers of curvature of such refractive surfaces are located toward the front or object side of the apex of said surfaces, the refractive index of the successive elements I to XI being designated respectively $n_D(I)$ to $n_D(XI)$, and the Abbé number of said successive elements being designated $\nu(I)$ to $\nu(XI)$, the positive lens elements VI and VII being made of fluorite, the absolute values of the refractive indices and Abbé numbers, the specific values for $R_1$ to $R_{18}$, $t_1$ to $t_{11}$ and $S_1$ to $S_7$ being substantially given in the table herebelow in terms of D which is the object-to-image distance of said objective system, $R_1 = $ Plano
$R_2 = $ Plano
$-R_3 = .01153D$
$-R_4 = .06770D$
$-R_5 = .03061D$
$R_6 = .24994D$
$-R_7 = .06395D$
$R_8 = .75484D$
$R_9 = .05418D$
$-R_{10} = .09075D$
$R_{11} = .26905D$
$R_{12} = .05418D$
$-R_{13} = .14120D$
$R_{14} = .05832D$
$R_{15} = .05518D$
$R_{16} = .21570D$
$-R_{17} = .10911D$
$R_{18} = .05621D$
$n_D(I) = 1.670$
$n_D(II) = 1.620$
$n_D(III) = 1.620$
$n_D(IV) = 1.514$
$n_D(V) = 1.689$
$n_D(VI) = 1.434$
$n_D(VII) = 1.668$
$n_D(VIII) = 1.434$
$n_D(IX) = 1.514$
$n_D(X) = 1.751$
$n_D(XI) = 1.613$
$\nu(I) = 47.2$
$\nu(II) = 60.3$
$\nu(III) = 60.3$
$\nu(IV) = 70.0$
$\nu(V) = 30.9$
$\nu(VI) = 95.1$
$\nu(VII) = 32.3$
$\nu(VIII) = 95.1$
$\nu(IX) = 70.0$
$\nu(X) = 27.8$
$\nu(XI) = 44.2$
$t_1 = .00553D$
$t_2 = .01133D$
$t_3 = .01181D$
$t_4 = .01383D$
$t_5 = .00713D$
$t_6 = .01542D$
$t_7 = .00713D$
$t_8 = .01596D$
$t_9 = .02830D$
$t_{10} = .01330D$
$t_{11} = .00798D$
$S_1 = .000708D$
$S_2 = .000213D$
$S_3 = .003086D$
$S_4 = .002500D$
$S_5 = .002445D$
$S_6 = .011011D$
$S_7 = .124293D$

References Cited

UNITED STATES PATENTS 3,118,964  1/1964  Buzawa _____ 350—177

OTHER REFERENCES

Herzberger et al., Applied Optics, vol. 2, No. 6, June 1963, pp. 553–560.

DAVID SCHONBERG, *Primary Examiner.*

R. J. STERN, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,405,993                                                          October 15, 1968

George H. Aklin et al.

It is certified that error appears in the above identified patent and that said Letters Patent are hereby corrected as shown below:

Column 3, line 33, ".06093$\angle$-$R_4$$\angle$.07477D" should read -- .06093D $\angle$-$R_4$ $\angle$.07447D --; line 75, before "VI" insert -- $V$ --. Column 4, line 52, "IX" should read -- XI --. Column 6, in the table, second column, line 15 thereof, "D(VIII)" should read -- $n_D$(VIII) --.

Signed and sealed this 10th day of March 1970.

(SEAL)
Attest:

Edward M. Fletcher, Jr.                                  WILLIAM E. SCHUYLER, JR.
Attesting Officer                                                   Commissioner of Patents